July 19, 1932.  F. H. BARNSLEY  1,868,189
EXTRUSION PRESS
Filed April 23, 1931
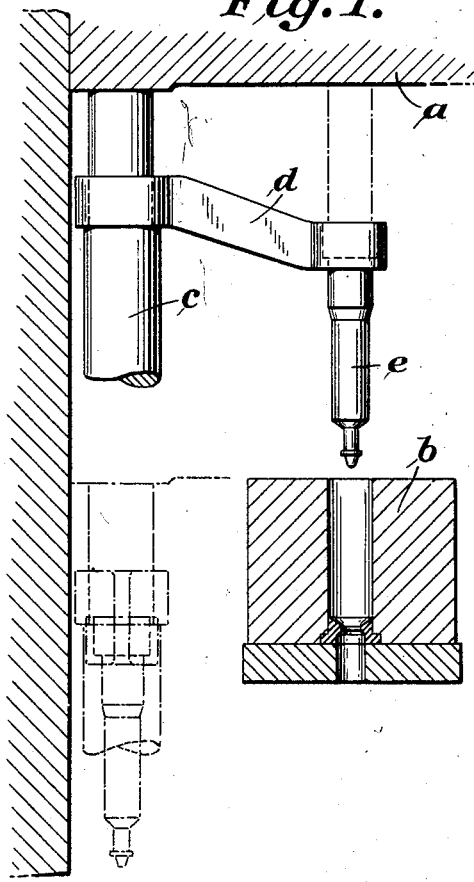
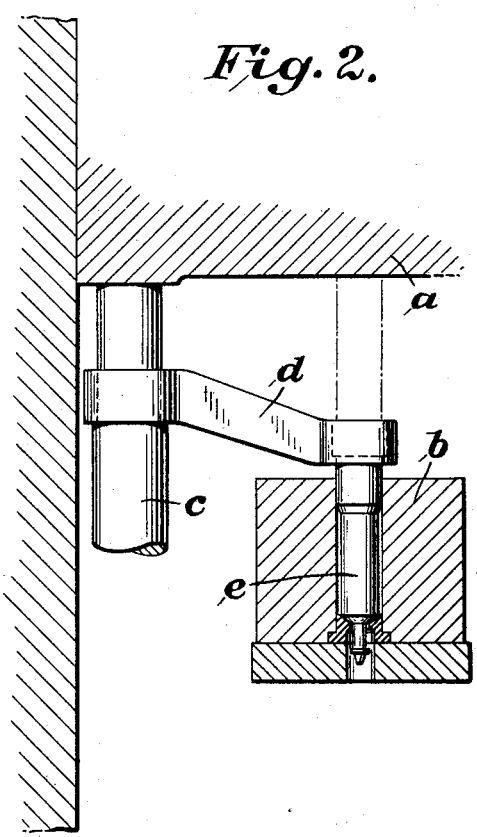
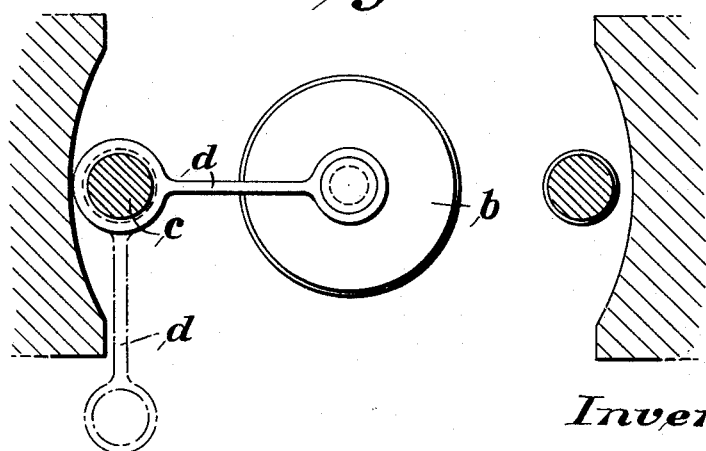
Inventor:
Frank Herbert Barnsley,
By K. P. McElroy
Atty.

Patented July 19, 1932

1,868,189

UNITED STATES PATENT OFFICE

FRANK HERBERT BARNSLEY, OF SMETHWICK, BIRMINGHAM, ENGLAND, ASSIGNOR TO IMPERIAL CHEMICAL INDUSTRIES LIMITED, A CORPORATION OF GREAT BRITAIN

EXTRUSION PRESS

Application filed April 23, 1931, Serial No. 532,305, and in Great Britain May 1, 1930.

This invention relates to extrusion presses with particular reference to those employed for the manufacture of seamless tubes of non-ferrous metals.

In all methods of extrusion hitherto adopted a residue or discard is left in the container, and many attempts have been made to satisfactorily remove and dispose of this waste material. Thus in some cases the extruded article with the discard attached is ejected from the container and the two thereafter severed while in other cases a round cutting tool operated either by hand hammer or by the pressure of the press has been employed for the actual cutting-off operation but in such cases the tool has to be inserted in the container before and withdrawn from the container after the cutting operation, by hand, so that this arrangement reduces the number of operations of the press that are possible in a given time and imposes considerable manual labour upon the operator.

The object of the present invention is to provide improved means for removing the residue or discard which will facilitate the carrying out of the necessary operations and increase the output of the press.

The invention consists in an extrusion press having a tool suspended from or carried by the moving head of the press and operated by said head or by the extrusion plunger for the purpose of cutting and removing the residue or discard from the extruded article.

Further features of the invention will be apparent from the description given hereafter.

The accompanying drawing illustrates one mode of carrying out the invention.

Figure 1 is an elevation showing a part of an extrusion press constructed and operated in accordance with the invention.

Figure 2 is a similar view but showing the parts in a different position, and

Figure 3 is a plan view showing the cutting tool in its operative and inoperative positions.

In carrying my invention into effect in one convenient manner as, for example, in its application to an extrusion press for the formation of seamless tubes, I form my press in any usual or suitable manner with a reciprocating head $a$ and bored blank container $b$ which rests on the bored bed plate and contains a die or like extruding means of the usual construction, and to the reciprocating head I secure a lifting rod or other fitting $c$ serving as a pivot about which may be rotated an arm $d$ carrying a circular cutting tool $e$ which is to perform the operation of cutting and removing the discard from the container. The arrangement is such that when the extrusion plunger is required to perform its extrusion stroke the cutting tool is rotated into the position shown dotted in Figures 1 and 3 so that thereby it will be clear of the container and the extrusion operation performed in the usual manner. After the return of the plunger to its upper position the cutting tool is then swung into the position shown by the full lines in Figures 1 and 3 whereupon the extrusion plunger (fits into and seats itself in a recess in the top of the cutting tool as shown in dotted lines in Figs. 1 and 2 and the assemblage) is lowered for the cutting stroke as shown in Figure 2. Upon the withdrawal of the extrusion plunger and cutting tool the latter is swung outside the container with the discard attached and when this discard has been removed the press is again ready for another operation.

The cutting tool arm may be moved by hand and while the invention has been described with particular reference to an extrusion press for the formation of seamless tubes it will be clear that it may be applied with equal effect and like advantage in other extrusion presses in which similar operations are to be carried out and independently of whether such presses are vertical or horizontal.

I claim:

1. In an extrusion press provided with an extrusion plunger carried on a reciprocating head and a blank container containing a die and associated with a base plate, lifting means attached to said head, a rotary arm carried by and pivoted on said lifting means, and a cutting tool mounted on said rotary arm and thus adapted to be swung into or away from operating position beneath said extruding plunger and to be operated by it.

2. In an extrusion press provided with an extruding plunger carried on a reciprocating head and a blank container containing a die and associated with a base plate, a lifting rod carried by said head, a rotary arm carried by and pivoted on said lifting rod, a cutting tool mounted on said rotary arm and thus adapted to be swung out of position when not in operation, a recess in the top of said cutting tool forming a seat for the reception of said extruding plunger when said tool is swung into operating position beneath the plunger and means on the bottom of said cutting tool to cut and remove the waste portion of an extruded tube.

3. In an extrusion press comprising a reciprocating head provided with an extrusion plunger, a cutting tool carried by said head and adapted to be moved into and out of position under said extrusion plunger and a recess in the top of said tool forming a seat for the reception of the plunger.

In testimony whereof, I affix my signature.

FRANK HERBERT BARNSLEY.